United States Patent
Trout et al.

(10) Patent No.: US 11,827,447 B2
(45) Date of Patent: Nov. 28, 2023

(54) TELESCOPING CONTAINER SYSTEM

(71) Applicant: Eco-Built Homes, LLC, Billings, MT (US)

(72) Inventors: Edward J. Trout, Billings, MT (US); Steve Dickman, Donalsonville, GA (US)

( * ) Notice: Subject to any disclaimer, the term of this patent is extended or adjusted under 35 U.S.C. 154(b) by 279 days.

(21) Appl. No.: 17/122,897

(22) Filed: Dec. 15, 2020

(65) Prior Publication Data

US 2021/0188532 A1 Jun. 24, 2021

Related U.S. Application Data

(60) Provisional application No. 62/952,407, filed on Dec. 22, 2019.

(51) Int. Cl.
| | |
|---|---|
| *B65D 88/00* | (2006.01) |
| *B65D 90/08* | (2006.01) |
| *B65D 88/12* | (2006.01) |
| *B65D 21/08* | (2006.01) |
| *B60P 3/34* | (2006.01) |
| *B65D 90/54* | (2006.01) |
| *E04B 1/343* | (2006.01) |

(52) U.S. Cl.
CPC ............ *B65D 88/005* (2013.01); *B60P 3/34* (2013.01); *B65D 21/086* (2013.01); *B65D 88/121* (2013.01); *B65D 90/08* (2013.01); *B65D 90/54* (2013.01); *E04B 1/3431* (2013.01)

(58) Field of Classification Search
CPC .... B65D 88/005; B65D 88/121; B65D 90/08; B65D 90/021; B65D 90/54; B65D 90/56; B65D 90/623; B65D 21/086; B60P 3/34; E04B 1/34305; E04B 1/3431
See application file for complete search history.

(56) References Cited

U.S. PATENT DOCUMENTS

| | | | | |
|---|---|---|---|---|
| 5,620,224 | A * | 4/1997 | DiBiagio | B60P 3/34 74/89.17 |
| 6,108,983 | A * | 8/2000 | Dewald, Jr. | B60P 3/34 296/26.14 |
| 6,257,638 | B1 * | 7/2001 | Graber | B60P 3/34 296/26.08 |
| 6,325,437 | B2 | 12/2001 | Hiebert et al. | |
| 6,428,073 | B1 * | 8/2002 | Blodgett, Jr. | B60P 3/34 296/26.14 |
| 6,598,354 | B2 | 7/2003 | McManus et al. | |

(Continued)

*Primary Examiner* — John K Fristoe, Jr.
*Assistant Examiner* — Jennifer Castriotta
(74) *Attorney, Agent, or Firm* — Antoinette M. Tease

(57) ABSTRACT

A telescoping container system with a first container and a second container that is configured to slide into and out of the second container. The invention includes first, second and third elongated gaskets that are configured to create various seals between the first and second containers and a wiper seal that creates a further seal between the top front rail of the first container and the top panel of the second container. The invention includes two non-pivoting guide wheels situated at the top of the rear end of the second container and two pivoting guide wheel assemblies situated on wings that extend inwardly front the front corner posts of the first container. The pivoting guide wheel assembly allows the invention to seal in each direction by pivoting backward and forward.

15 Claims, 17 Drawing Sheets

(56) References Cited

U.S. PATENT DOCUMENTS

| | | | |
|---|---|---|---|
| 6,851,734 B2* | 2/2005 | Findley | B62D 61/12 |
| | | | 296/171 |
| 7,418,802 B2 | 9/2008 | Sarine et al. | |
| 9,103,111 B2 | 8/2015 | Nakajima et al. | |
| 10,219,447 B1 | 3/2019 | DeCarli et al. | |
| 2001/0008059 A1 | 7/2001 | McManus et al. | |
| 2003/0213185 A1 | 11/2003 | Findley | |
| 2007/0079573 A1 | 4/2007 | Sarine et al. | |
| 2012/0006369 A1 | 1/2012 | Cantin et al. | |
| 2012/0151851 A1 | 6/2012 | Cantin et al. | |
| 2012/0261407 A1 | 10/2012 | Cross et al. | |
| 2014/0202089 A1 | 7/2014 | Nakajima et al. | |

\* cited by examiner

TELESCOPING CONTAINER SYSTEM

CROSS-REFERENCE TO RELATED APPLICATION

Pursuant to 35 U.S.C. § 119(e), this application claims the benefit of U.S. Patent Application No. 62/952,407 filed on Dec. 22, 2019, the contents of which are incorporated herein by reference.

BACKGROUND OF THE INVENTION

1. Field of the Invention

The present invention relates generally to the field of intermodal containers, and more particularly, to a telescoping container system in which a smaller container is telescopically contained within a larger container.

2. Description of the Related Art

The present invention provides a telescoping container system in which one container is slidably coupled with another in a manner that allows a smaller container to slide into and out of a larger container while maintaining a seal between the two containers. Two pairs of guide wheels, one pair of which is a set of pivoting guide wheels, enable the seal mechanism to function effectively. The present invention also incorporates the telescoping frame system disclosed in U.S. Pat. Nos. 9,555,558, 8,959,843 and 8,844, 212. Although the inventions discussed below deal generally with telescoping compartments or living quarters, none of these inventions includes the pivoting guide wheel and gasket features of the present invention.

U.S. Pat. No. 6,108,983 (Dewald, Jr. et al, 2000) discloses a retractable room for mobile living quarters with a linkage that operates a riser mechanism to raise and lower the floors as the room is extended and retracted. According to the inventors, the riser mechanism is operated by a lever that pivots in response to movement of the floor to a predetermined position relative to the main living quarters.

U.S. Pat. No. 6,325,437 (Hiebert et al., 2001) provides a slide-out compartment for a vehicle in which a first vehicle compartment is mounted to a second vehicle compartment, and a follower is slidably mounted within a channel in the second vehicle compartment. The follower is also mounted to the distal end of the actuator, which causes the first compartment to move relative to the second compartment.

U.S. Pat. No. 6,598,354 (McManus et al., 2003) discloses a retractable room system with a main frame supporting a main living area and a slide-out room that slides between an extended position and a retracted position relative to the main living area. An extendable member mounted on the main frame is rigidly connected to the slide-out room floor so that the weight of the slide-out room is transferred from the floor of the main living room to the extendable member as the slide-out room moves from a retracted to an extended position.

U.S. Pat. No. 6,851,734 (Findley, 2005) provides a trailer or portable building with two telescoping open span box shells and a glide-over box shell section. Twin overhead "T" beams captivate a combination double foam weather seal and travel stop during extension. A suspension attached near the floor and near the ceiling allows walk-through floor space between the wheels when the trailer floor is in the drop-down mode.

U.S. Pat. No. 7,418,802 (Sarine et al., 2008) discloses an expandable shelter system having a transport mode in which a side expandable section is completely nested within an International Organization for Standardization (ISO)-style container and a deployment mode in which the side expandable section is completely protracted from the main shelter system. The flooring structure has a hinged flooring panel assembly with at least two floor panels that are hinged together so that they can be stacked compactly in a vertical direction when the side expandable section is nested within the main shelter section.

U.S. Pat. No. 9,103,111 (Nakajima et al., 2015) provides a deployment shelter with movable roof, floor, side and end panels, all of which are driven by actuators. The floor panel is coupled to the roof panel with four poles, which are also attached to the movable end panels. All of the movable panels are configured to move between an open and a closed position.

U.S. patent Ser. No. 10/219,447 (DeCarli et al., 1029) discloses a container system for use in farming. The container includes components and tools for assisting communities in conducting agricultural activities for off-grid localized food production. In one embodiment, the invention comprises a first container that is configured to fit within a second container. The second container has an open side with a wall section that is associated with the top of the second container and extends toward the top of the first container to close the space between the top of the second container and the top of the primary container when the system is in transport mode. The closed side of the first container forms one of the sides of the second container when positioned inside of the second containers, and a movement mechanism that is positioned between the first and second containers moves the first container into and out of the second container.

U.S. Patent Application Pub. Nos. 20120006369 and 20120151851 (Cantin et al.) provide an expandable shelter with the approximate dimensions of an ISO freight container. The expandable shelter has first and second substantially parallel corner posts disposed at a first end of the shelter and a ramp coupled with hinges that is disposed between the first and second corner posts when in a closed position. In one embodiment, the expandable shelter includes first and second expandable modules. A side wall of the container pivots downwardly about hinges to serve as a floor panel for the module. This panel may include a flange with a gasket that seals the interior of the shelter when in a deployed position.

U.S. Patent Application Pub. No. 20120261407 (Cross et al.) discloses a sea-land shipping container slideout conversion system in which the slideout unit has a floor, three walls and a roof. The slideout unit is mounted on a pair of vertically parallel slidable elevation members, which are slidably attached to two parallel horizontal sliding rails. The side of the container is cut out for the slideout unit, and a ridged steel frame is welded into the cut-out. A plurality of seals disposed about the slideout unit seal the slideout unit to the container both in an open and in a closed position. When the slideout unit is slid out of the container and lowered, it is locked in place outside of the container so that the floor of the slideout unit is level with the floor of the container.

BRIEF SUMMARY OF THE INVENTION

The present invention is a telescoping container system comprising: a first container having a top panel, a floor, a first side wall, a second side wall, a rear wall, and two front corner posts; a second container having a top panel, a floor, a first side wall, a second side wall, a front wall and two front corner posts, the second container being configured to slide into and out of the first container; a first non-pivoting guide wheel and a second non-pivoting guide wheel; a first pivoting guide wheel assembly and a second pivoting guide wheel assembly, each pivoting guide wheel assembly comprising a hinge, a front pivoting wheel plate, a rear pivoting wheel plate, and a wheel, the front and rear pivoting wheel plate both being pivotally attached to the hinge; two first elongated gaskets, a second elongated gasket, and two third elongated gaskets; and a front top rail that extends across a front edge of the top panel of the first container; wherein each of the first elongated gaskets is supported by a vertical gasket plate that extends laterally outward from the rear wall of the second container; wherein the second elongated gasket is situated along a horizontal gasket plate that extends across a top of the rear wall of the second container; wherein both of the first elongated gaskets are oriented perpendicularly relative to the second elongated gasket; wherein each of the first elongated gaskets is situated between one of the two side walls of the second container and one of the two sides walls of the first container; wherein the second elongated gasket is situated between the top panel of the second container and the top panel of the first container; wherein the second container has two rear corners, and each of the first and second non-pivoting guide wheels is situated at a top of one of the two rear corners of the second container; wherein each of the pivoting guide wheel assembles is situated on a wing that extends inwardly from one of the two front corner posts of the first container; wherein each of the first elongated gaskets is configured to create a seal between one of the two vertical gasket plates and a back surface of one of the wings when the invention is in an open position; wherein the second elongated gasket is configured to create a seal between the horizontal gasket plate and a rear surface of the front top rail when the invention is in an open position; wherein each of the third elongated gaskets extends vertically along a back surface of each of the front corner posts of the second container; and wherein each of the third elongated gaskets is configured to create a seal between each of the front corner posts of the second container and a front surface of each of the wings when the invention is in a closed position.

In a preferred embodiment, the invention further comprises a wiper seal that extends downwardly from a bar that is situated underneath the front top rail; wherein the top panel of the second container has a width, and wherein the wiper seal is at least as long as the width of the top panel of the second container; and wherein the wiper seal is configured to create a seal between the top panel of the second container and a front edge of the top panel of the first container. In another preferred embodiment, when the second container is situated inside of the first container, there is a certain distance between the side walls of the first container and the side walls of the second container; wherein the horizontal gasket plate extends beyond each of the first and second side walls of the second container for a distance that is less than the distance between the side walls of the first container and the side walls of the second container; wherein the horizontal gasket plate has a length, the rear wall of the second container has a width, and the length of the horizontal gasket plate is greater than the width of the rear wall of the second container; wherein the first non-pivoting guide wheel is connected to a first distal end of the horizontal gasket plate via a first bracket; wherein the second non-pivoting guide wheel is connected to a second distal end of the horizontal gasket plate via a second bracket; and wherein the first non-pivoting guide wheel is configured to be proximate to a corner bracket of the first container when the invention is in a closed position.

In yet another preferred embodiment, the first elongated gasket has a length, the second container has a height, and the length of the first elongated gasket is approximately equal to the height of the second container; and wherein the second elongated gasket has a length, the horizontal gasket plate has a length, and the length of the second elongated gasket is approximately equal to the length of the horizontal gasket plate. Preferably, the second elongated gasket is situated on top of the top panel of the second container; and the horizontal gasket plate is situated above the top panel of the second container. Each of the first elongated gaskets preferably has a top end; wherein the top end of each of the first elongated gaskets is lower than the non-pivoting guide wheel; and wherein the non-pivoting guide wheel is situated on a same horizontal plane as the second elongated gasket.

In a preferred embodiment, each of the front corner posts of the first container has a top and a bottom, and each wing extends from the top to the bottom of the front corner post; wherein each of the wings has a width, wherein there is a certain distance between the side walls of the first container and the side walls of the second container, and wherein the width of each wing is less than the distance between the first and second containers; wherein the vertical gasket plate has a width, and wherein the width of each wing is approximately equal to the width of the vertical gasket plate; and wherein a top end of each wing is situated underneath the top front rail. Preferably, each wing comprises a cutout that is situated behind and beneath the wiper seal; and each of the pivoting guide wheel assemblies is situated within the cutout in one of the two wings. In a preferred embodiment, the wheel is attached via a pin to a bracket that is pivotally attached to the hinge; and the bracket is longer than the front and rear pivoting wheel plates so that the wheel is not surrounded by the plates.

In a preferred embodiment, the first elongated gasket is configured to abut up against the rear pivoting wheel plate when the second container is moved fully forward. Preferably, each of the pivoting guide wheel assemblies is situated lower than each of the non-pivoting guide wheels relative to the top panel of the first container. Each of the pivoting guide wheel assemblies is preferably situated beneath the wiper seal and at or below a level of the top panel of the second container.

In a preferred embodiment, the wheel of each of the pivoting guide wheel assemblies is configured to be proximate to a rear corner post of the second container when the second container is in a fully extended position. Preferably, the top end of the first elongated gasket is configured to abut up against the rear pivoting wheel plate, thereby causing the pivoting guide wheel assembly to pivot forward, when the second container is moved fully forward. Preferably, the third elongated gasket is configured to come into contact with the front pivoting wheel plate of the pivoting guide wheel assembly, thereby causing the pivoting guide wheel assembly to pivot rearward, when the invention is in a closed position.

REFERENCE NUMBERS

Figure 1:
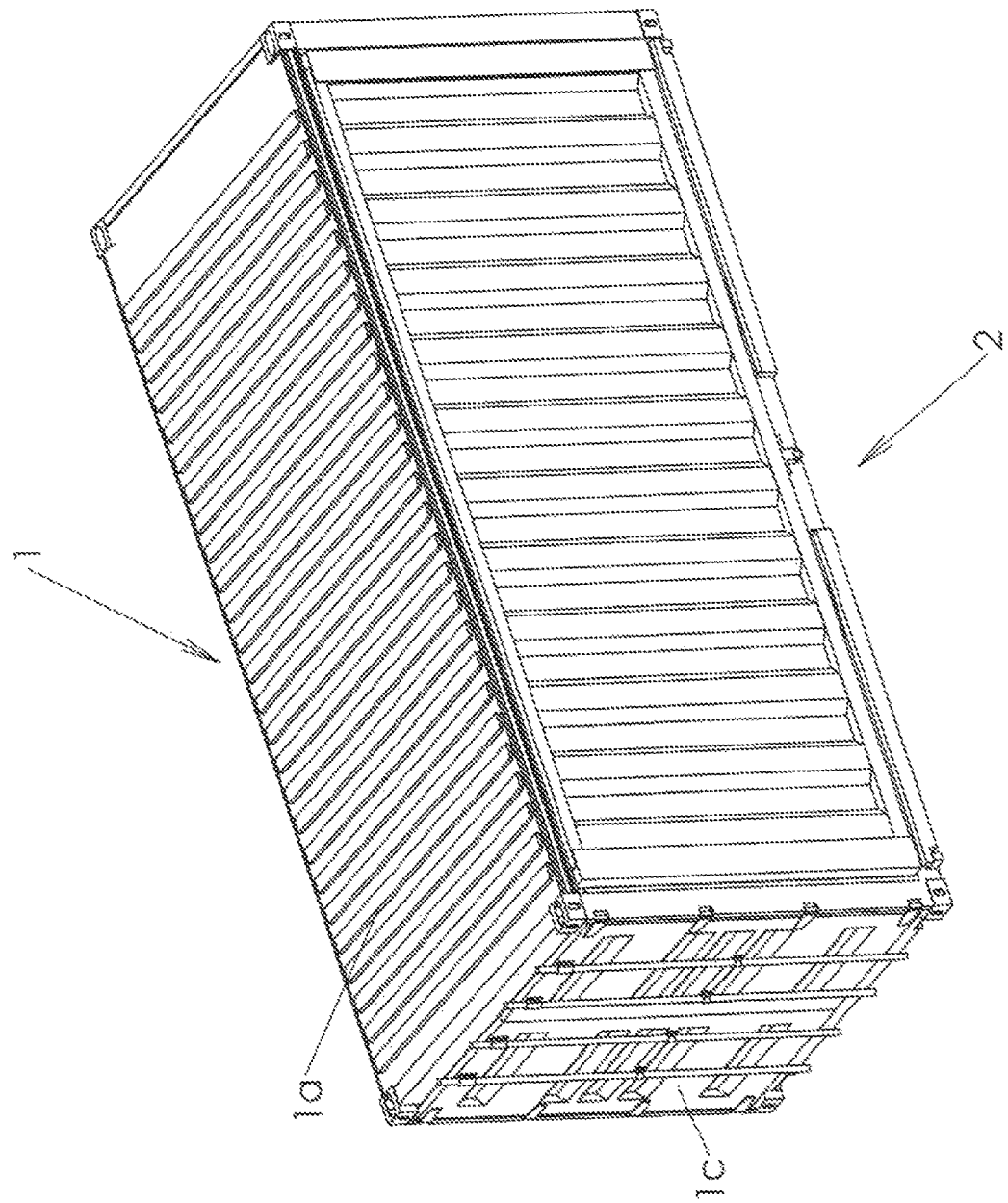
FIG. 1 is a front perspective view of the present invention shown in a closed position.

1 First container
1a Top panel (of first container)
1b Floor (of first container)
1c Side wall (of first container)
1d Rear wall (of first container)
2 Second container
2a Top panel (of second container)
2b Floor (of second container)
2c Side wall (of second container)
2d Front wall (of second container)
3 Telescoping frame system
4 Front top rail (of first container)
5 Wiper seal
6 Bar
7 Non-pivoting guide wheel
8 Horizontal gasket plate
9 Bracket
10 Corner bracket
11 Vertical gasket plate
12 First elongated gasket
13 Second elongated gasket
14 Front corner post (of first container)
14a Wing (of front corner post)
14b Cutout/window (in wing)
14c Cap (on front corner post)
15 Pivoting guide wheel assembly
15a Front pivoting wheel plate
15b Rear pivoting wheel plate
15c Wheel
15d Pin
15e Bracket
16 Hinge
17 Front corner post (of second container)
18 Third elongated gasket
19 Rear corner post (of second container)

DETAILED DESCRIPTION OF INVENTION

FIG. 1 is a front perspective view of the present invention shown in a closed position. As shown in this figure, the present invention comprises a first container 1 and a second container 2. The first container is preferably a standard ISO container with the front panel removed. The second container 2 is configured to slide into and out of the first container 1. In this figure, the second container 2 is in a fully retracted position. Underlying the first and second containers is a telescoping frame system similar or identical to the one described in U.S. Pat. Nos. 8555558 (Trout et al., 2013), 8844212 (Trout et al., 2014), and 8959843 (Trout et al., 2015). The present invention pertains not to the underlying frame system but rather to a set of pivoting and non-pivoting guide wheels situated at the top of the first and second containers that facilitates the sliding of the second container into and out of the first container.

Figure 2:
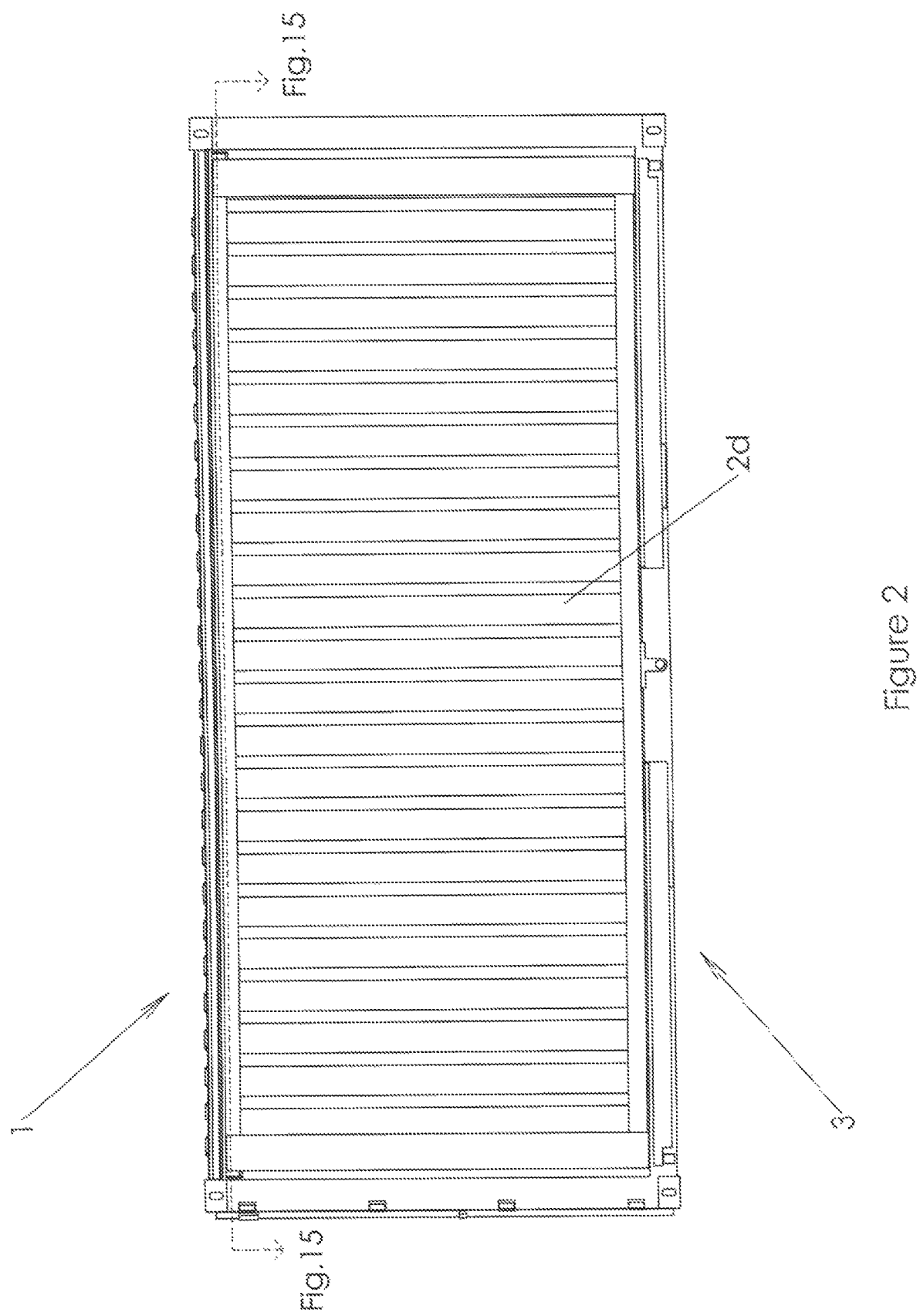
FIG. 2 is a front view of the present invention shown in a closed position.

FIG. 2 is a front view of the present invention shown in a closed position. This figure shows the underlying frame system 3, which is described in detail in the above-referenced patents. The first container 1 comprises a top panel 1a, a floor 1b, two side walls 1c, and a rear wall 1d. The second container comprises a top panel 2a, a floor 2b, two side walls 2c, and a front wall 2d. The first container does not have a front wall, and the second container does not have a rear wall.

Figure 3:
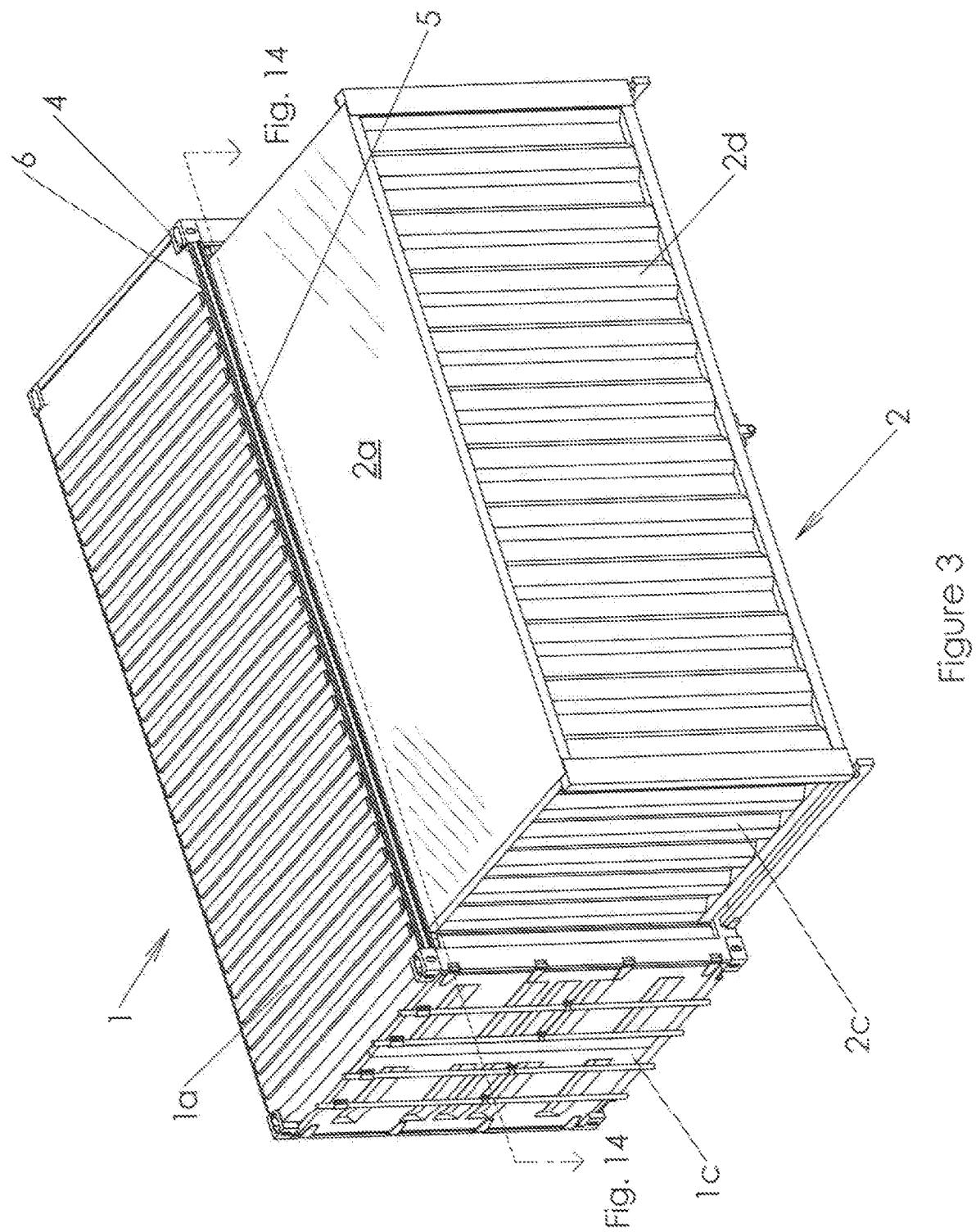
FIG. 3 is a front perspective view of the present invention shown in an open position.

FIG. 3 is a front perspective view of the present invention shown in an open position. In this figure, the second container 2 is in a fully extended position. A front top rail 4 extends across the front edge of the top panel 1a, and a wiper seal 5 extends downwardly from a bar 6 that is situated directly underneath the front top rail 4. The wiper seal 4 is at least as long (and preferably longer) than the width of the top panel 2a of the second container 2. The wiper seal 4 is configured to create a seal between the top panel 2a of the second container 2 and the front edge of the top panel 1a of the first container 1.

Figure 4:
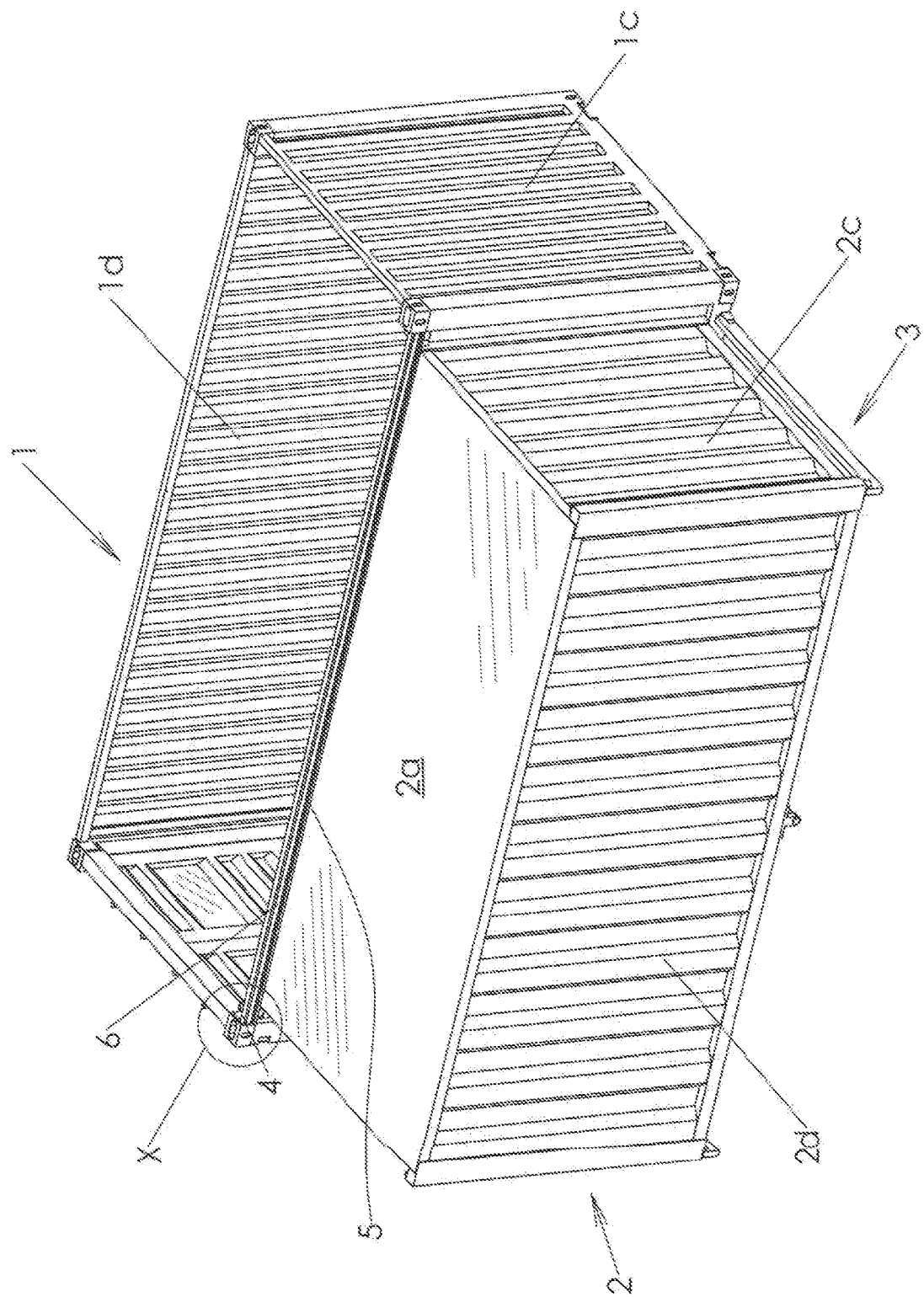
FIG. 4 is a front perspective view of the present invention shown in an open position with the top panel of the first container removed.

FIG. 4 is a front perspective view of the present invention shown in an open position with the top panel of the first container removed. The area designed as "X" in FIG. 4 is the area shown in detail in FIGS. 10, 11, 12 and 14.

Figure 5:
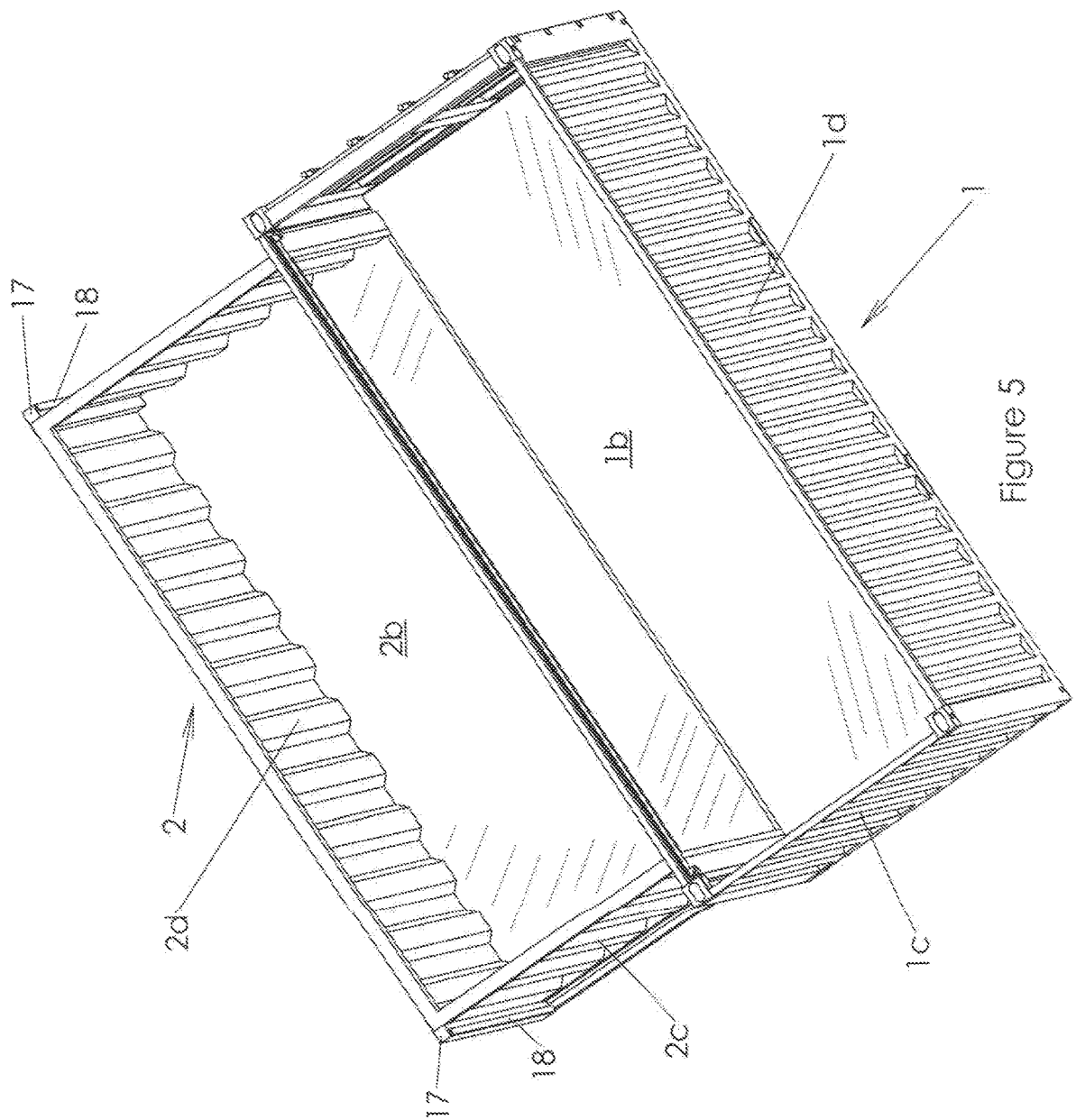
FIG. 5 is a rear perspective view of the present invention shown in an open position with the top panels of the first and second containers removed.

FIG. 5 is a rear perspective view of the present invention shown in an open position with the top panels of the first and second containers removed. In this figure, the top panel 2a of the second container 2 has been omitted so that the floor 2b of the second container 2 is visible.

Figure 6:
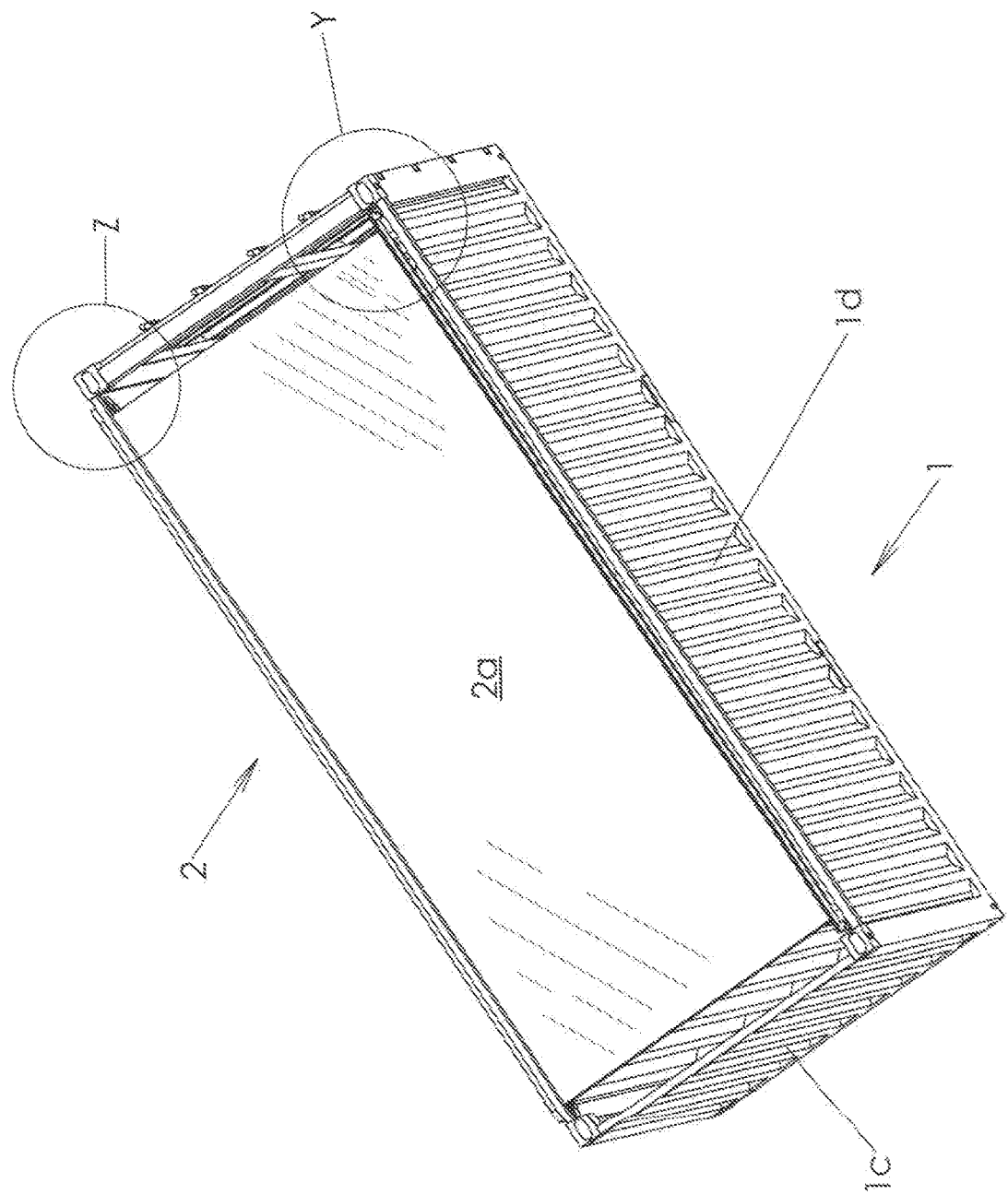
FIG. 6 is a rear perspective view of the present invention shown in a closed position with the top panel of the first container removed.

FIG. 6 is a rear perspective view of the present invention shown in a closed position with the top panel of the first container removed. The area designed as "Y" in FIG. 6 is the area shown in detail in FIGS. 7 and 8, and the area designated as "Z" in FIG. 6 is the area shown in detail in FIG. 9.

Figure 7:
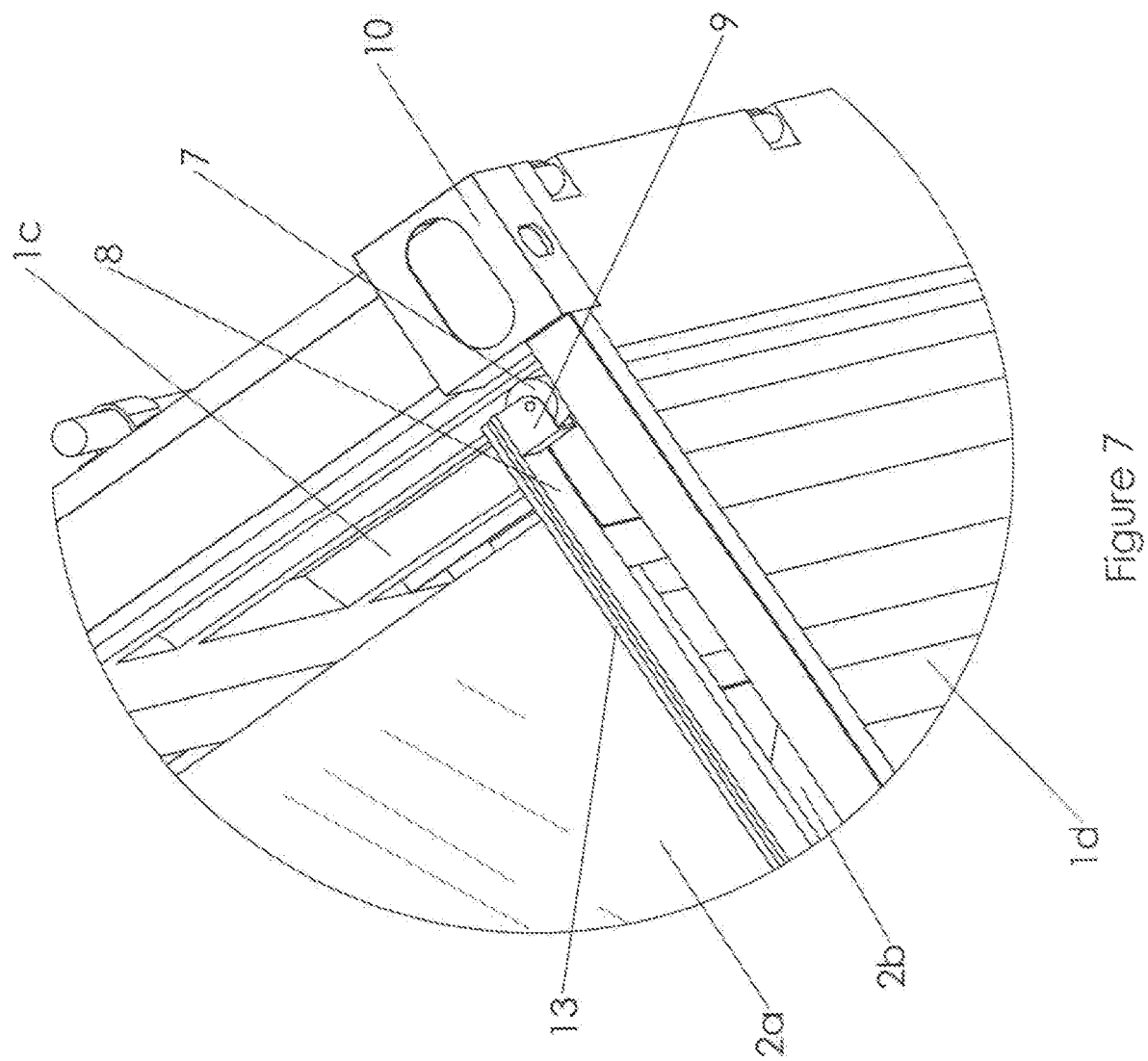
FIG. 7 is a top rear perspective detail view of the non-pivoting guide wheel shown with the present invention in a closed position.

FIG. 7 is a top rear perspective detail view of the non-pivoting guide wheel shown with the present invention in a closed position. The present invention comprises two non-pivoting guide wheels 7, each of which is situated at the top of one of the two rear corners of the second container 2. As shown in FIG. 7, a horizontal gasket plate 8 extends across a top rear edge of the top panel 2a and beyond each of the two side walls of the second container for a certain distance that is less than the distance between the first and second containers. The overall length of the horizontal gasket plate 8 is greater than the width of the front wall 2d of the second container 2. The non-pivoting guide wheel 7 is connected to a first distal end of the horizontal gasket plate 8 via a bracket 9. The purpose of the non-pivoting guide wheel 7 is to facilitate the sliding of the second container 2 into and out of the first container 1. The non-pivoting guide wheel is preferably configured so that it is proximate to the corner bracket 10 of the first container 1 when the invention is in a closed position.

Figure 8:
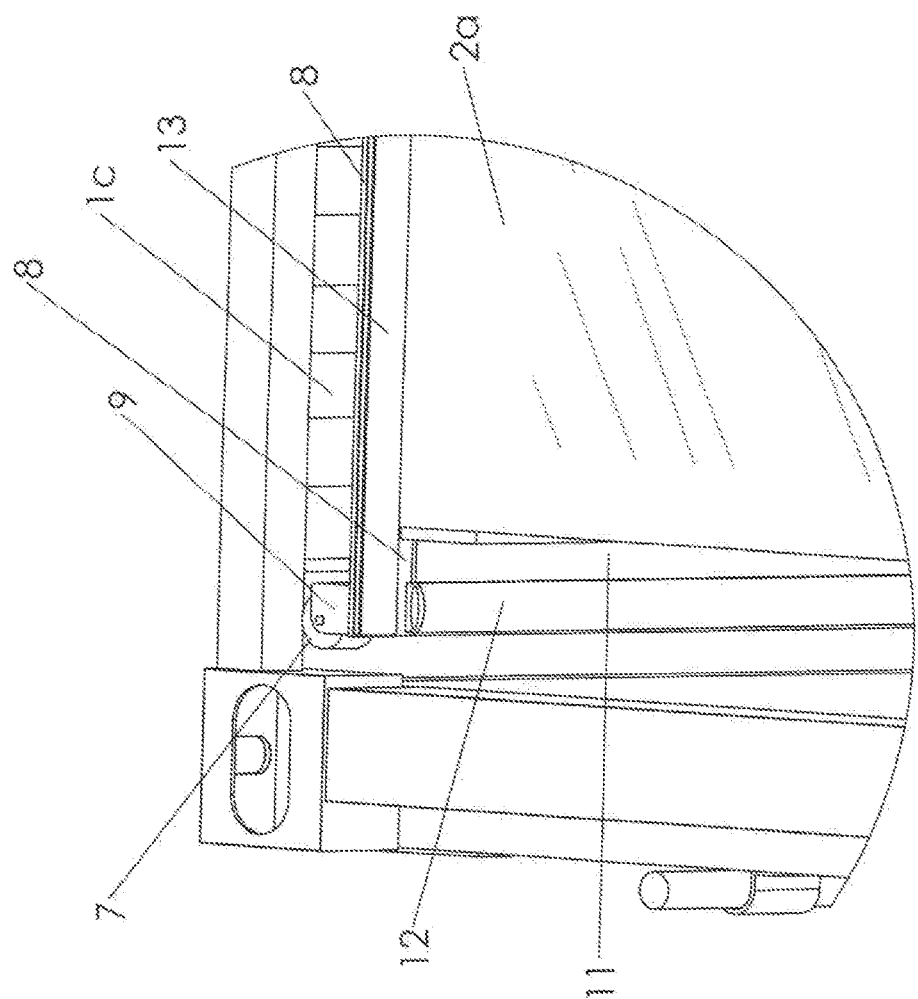
FIG. 8 is top front perspective detail view of the non-pivoting guide wheel shown with the present invention in a closed position.

FIG. 8 is top front perspective detail view of the non-pivoting guide wheel shown with the present invention in a closed position. This figure is taken with the present invention in the same position as is shown in FIG. 7, except from the front perspective rather than the rear perspective. As shown in this figure, the invention further comprises a vertical gasket plate 11 that extends laterally outward from a rear edge of the side wall 2c for the full height of the second container. The vertical gasket plate 11 supports a first elongated gasket 12 that is situated along the outermost edge of the vertical gasket plate 11. The invention further comprises a second elongated gasket 13 that is supported by the horizontal gasket plate 8. The second elongated gasket 13 is situated along the uppermost edge of the horizontal gasket plate 8. The length of the first elongated gasket 12 is preferably approximately equal to the height of the second container 2, and the length of the second elongated gasket 13 is preferably equal to the length of the horizontal gasket plate 8. The first and second elongated gaskets 12, 13 are oriented perpendicularly to each other. The second elongated gasket 13 is situated on top of (that is, higher than) the top panel 2a of the second container 2. The horizontal gasket plate 8 also extends higher than the top panel 2a of the second container 2, as shown. The first elongated gasket 12 is situated between the side wall 2c of the second container 2 and the side wall 1c of the first container. The second elongated gasket 13 is situated between the top panel 2a of the second container 2 and the top panel 1a (not shown) of the first container. Note that the top end of the first elongated gasket 12 is lower than the non-pivoting guide wheel 7, and the non-pivoting guide wheel 7 is situated on the same horizontal plane as the second elongated gasket 13 (see also FIG. 7).

Figure 9:
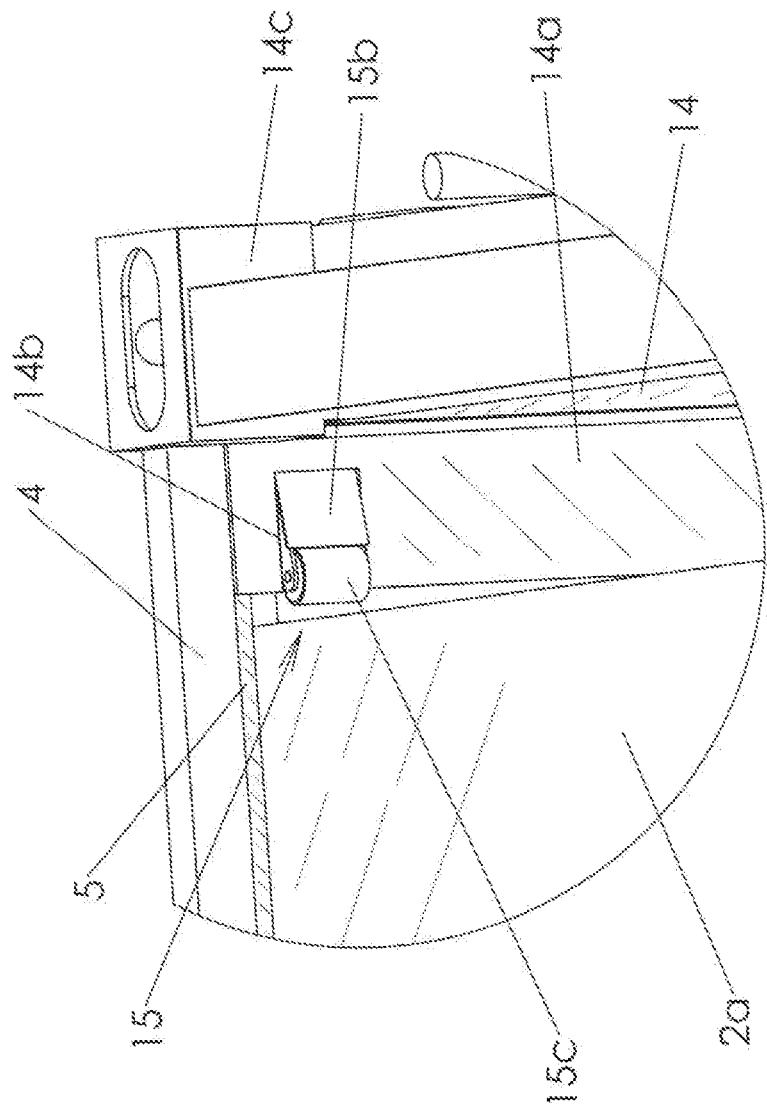
FIG. 9 is a top rear perspective detail view of the pivoting guide wheel shown with the present invention in a closed position.

FIG. 9 is a top rear perspective detail view of the pivoting guide wheel shown with the present invention in a closed position. As shown in this figure, the first container 1 comprises two front corner posts 14, each of which comprises a wing 14a that extends inwardly from the front corner post at the front of the first container 1 and from the top to the bottom of the front corner post 14. The width of each wing 14a is less than the distance between the first and second containers. In fact, the width of the wing 14a is preferably the same as the width of the vertical gasket plate 11. The top end of the wing 14a is situated directly underneath the front top rail 4. The top part of the wing 14a comprises a cutout or window 14b. This window 14b is situated behind and beneath the wiper seal 5. The wiper seal 5 is situated at the front of the front top rail 4, whereas the wing 14a is situated at the back of the front top rail 4, thereby leaving a space between the wiper seal 5 and the wing 14a. The front corner post comprises a cap 14c.

The pivoting guide wheel assembly 15 is situated in the window 14b in the wing 14a. A hinge (not shown) 16 is situated on the front side of the wing 14a, and the pivoting guide wheel assembly 15 pivots on this hinge. A front pivoting wheel plate 15a (not shown) and a rear pivoting wheel plate 15b, situated on the front and rear sides of the pivoting rear assembly, respectively, are both pivotally attached to the hinge 16. The wheel 15c is attached via a pin 15d to a bracket 15e, which is also pivotally attached to the hinge 16. The bracket 15e is longer than the front and rear pivoting wheel plates 15a. 15b so that the wheel 15c is not surrounded by the plates. In this manner, the pivoting guide wheel assembly 15 is configured to pivot or rotate from front to back and back to front within the window 14b.

Figure 10:
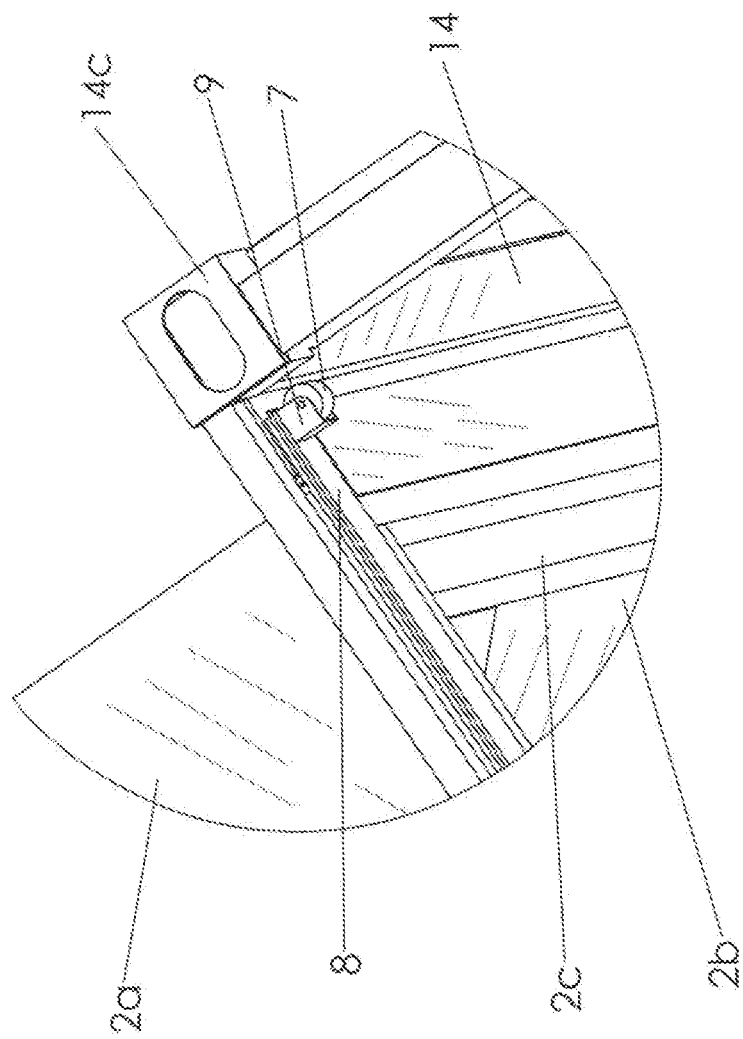
FIG. 10 is a top rear perspective detail view of the non-pivoting guide wheel shown with the present invention in an open position.

FIG. 10 is a top rear perspective detail view of the non-pivoting guide wheel shown with the present invention in an open position. In this figure, the second compartment 2 has been moved fully forward into the position shown in FIG. 3. As shown, the non-pivoting guide wheel moves forward until it is proximate to the front corner post, 14.

Figure 11:
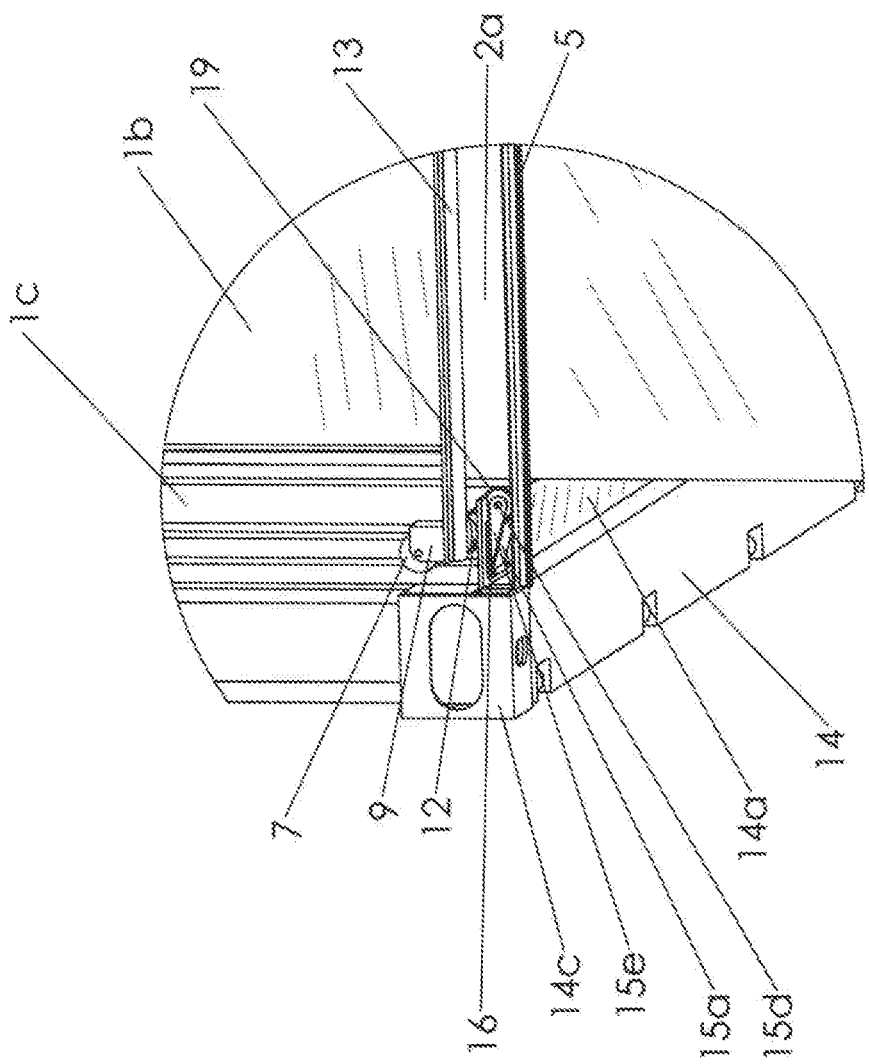
FIG. 11 is top front perspective view of the pivoting and non-pivoting guide wheels shown with the invention in an open position.

FIG. 11 is top front perspective view of the pivoting and non-pivoting guide wheels shown with the invention in an open position. When the second container 2 is moved fully forward, the top end of the first elongated gasket 12 abuts up against the rear pivoting wheel plate 15b, thereby causing the pivoting guide wheel assembly 15 to pivot forward to the position shown in this figure. The second elongated gasket 13 creates a seal between the horizontal gasket plate 8 and the front top rail 4, which has been omitted form this figure for clarity.

Figure 12:
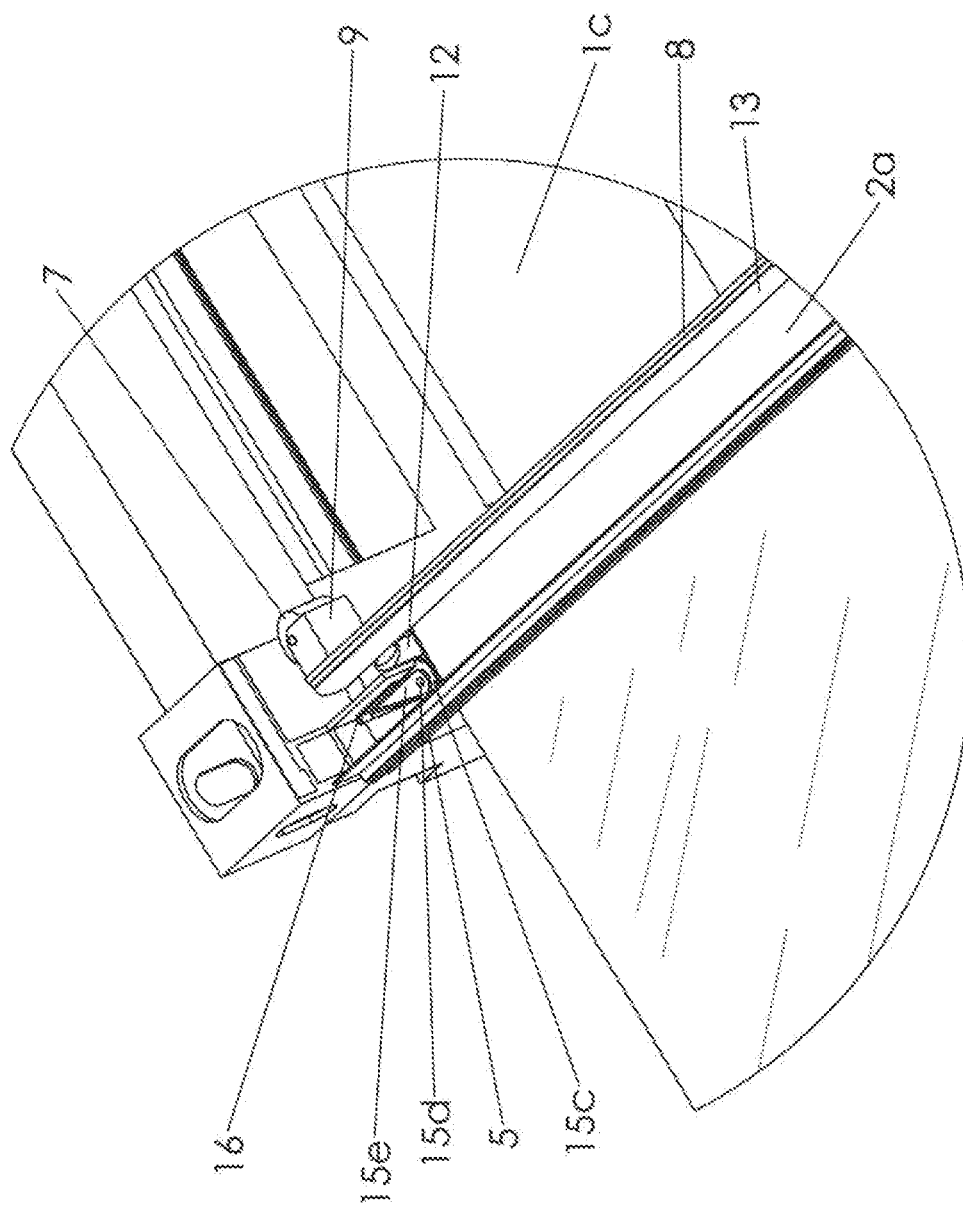
FIG. 12 is a top perspective view of the pivoting and non-pivoting guide wheels shown with the invention in an open position.
Figure 13:
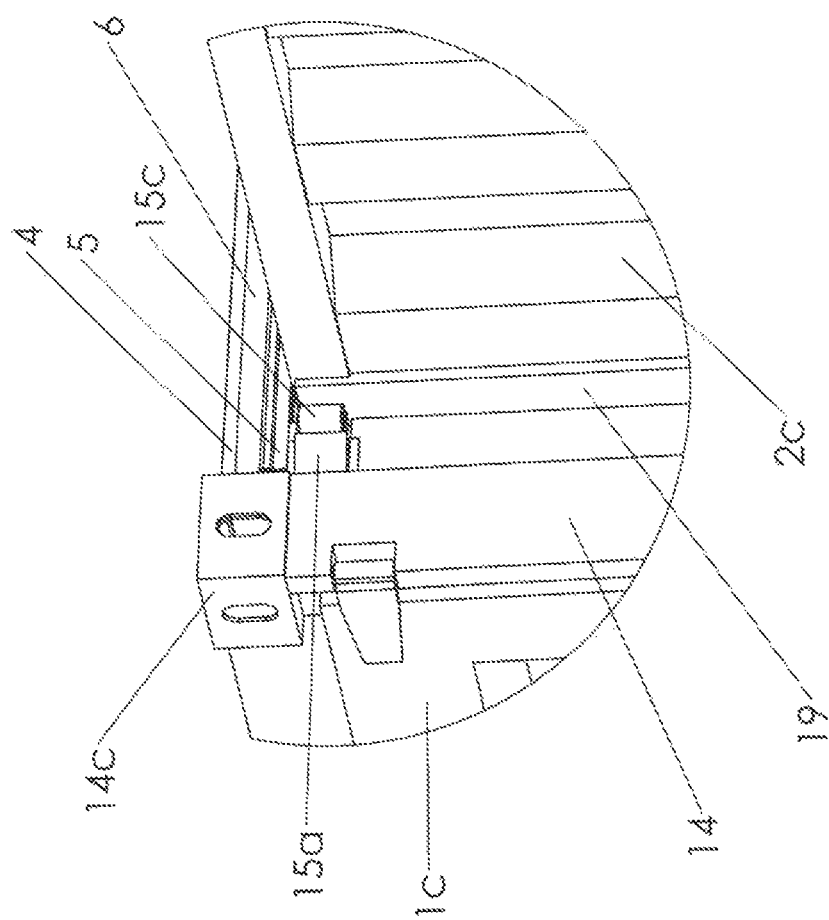
FIG. 13 is a detail perspective view of the front top left corner of the present invention shown in an open position.

FIG. 12 is a top perspective view of the pivoting and non-pivoting guide wheels shown with the invention in an open position. Note that the front top rail 4 has been removed from this figure for clarity. This figure clearly illustrates that the pivoting guide wheel assembly 15 is situated lower than the non-pivoting guide wheel 7. The non-pivoting guide wheel 7 is situated on the distal end of the horizontal gasket plate 8, which is situated above the top panel 2a of the second container 2. The pivoting guide wheel assembly 15 is situated beneath the wiper seal and at or slightly below the level of the top panel 2a of the second container 2(see FIG. 13).

Figure 14:
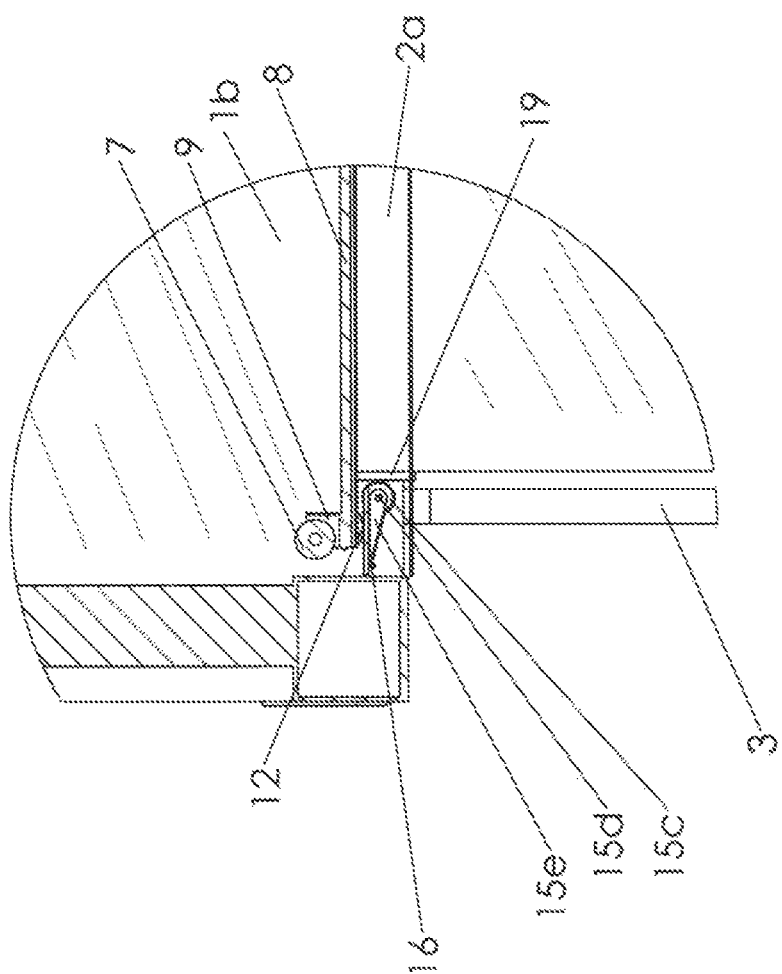
FIG. 14 is a section view of the present invention taken from the line shown in FIG. 3.

FIG. 14 is a section view of the present invention taken from the line shown in FIG. 3. As shown in this figure, the wheel 15c of the pivoting guide wheel assembly 15 is configured so that it comes into contact with the rear corner post 19 of the second container when the second container is fully extended (see also FIG. 11).

Figure 15:
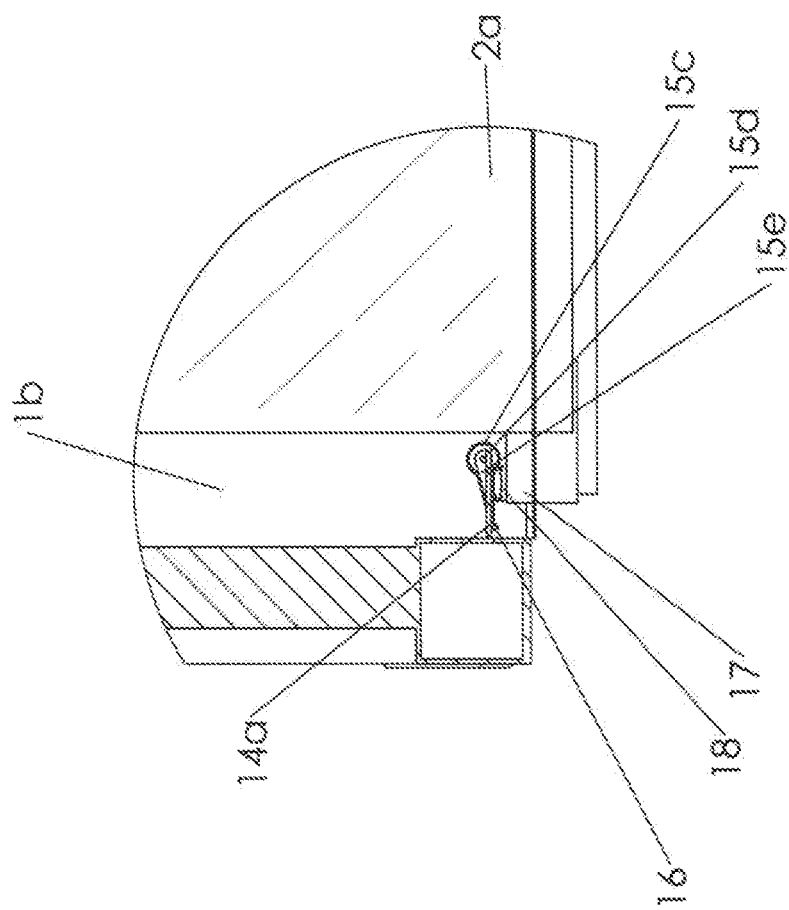
FIG. 15 is a section view of the present invention taken from the line shown in FIG. 2.
Figure 16:
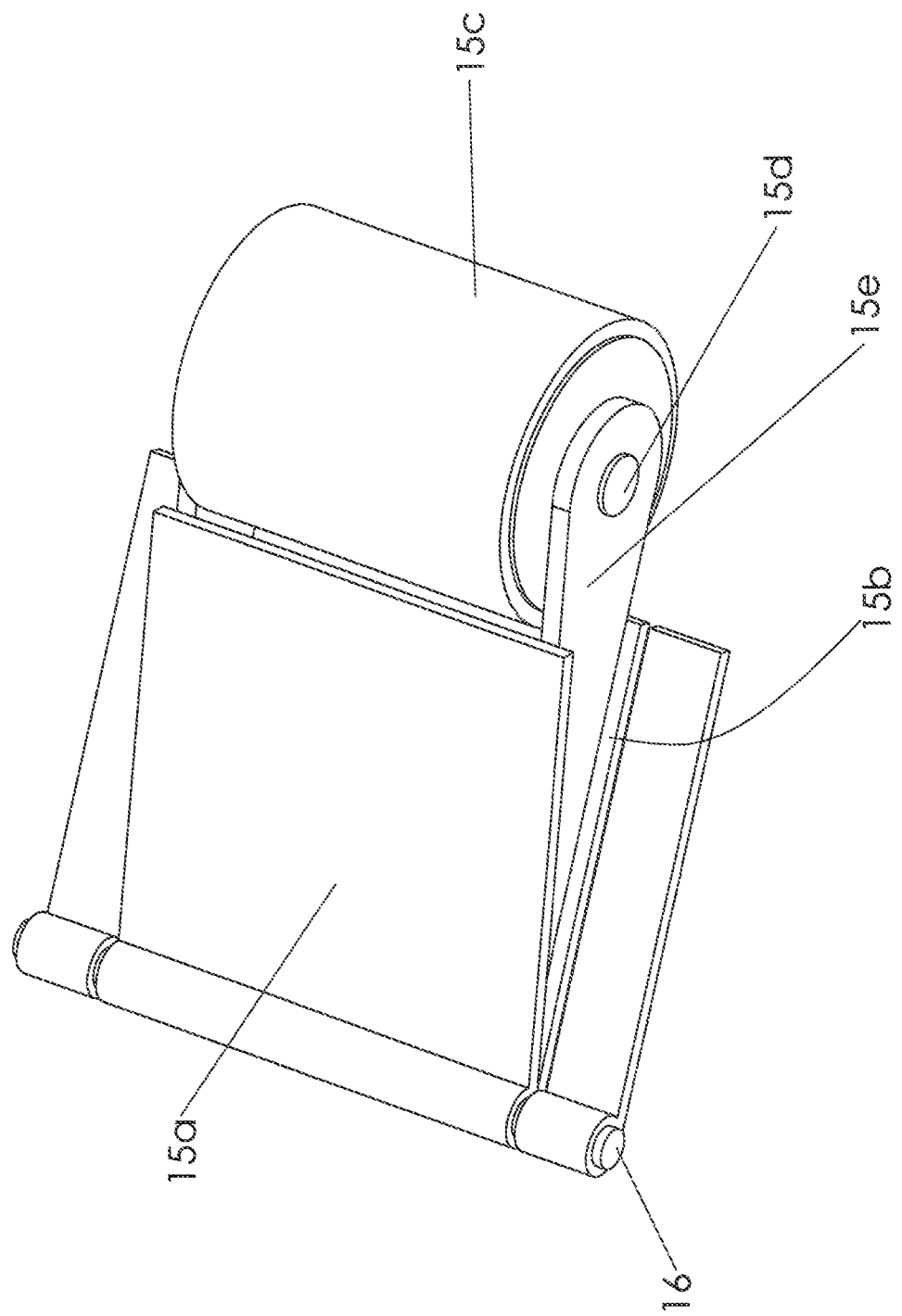
FIG. 16 is a perspective view of the pivoting guide wheel assembly of the present invention.
Figure 17:
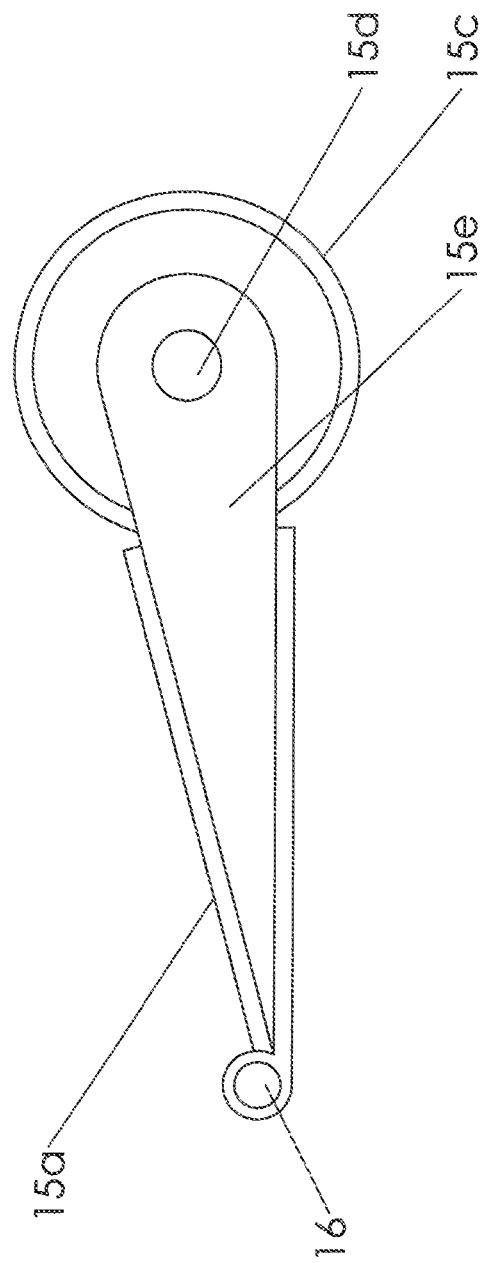
FIG. 17 is a side view of the pivoting guide wheel assembly of the present invention.

FIG. 15 is a section view of the present invention taken from the line shown in FIG. 2. As shown in this figure, the second container comprises two front corner posts 17, each of which has a back surface. A third elongated gasket 18 extends vertically along the outer edge of the back surface of each of the front corner posts 17 (see FIG. 5). When the invention is in a closed position, the third elongated gasket 18 comes into contact with the front pivoting wheel plate 15a of the pivoting guide wheel assembly 15, thereby causing the pivoting guide wheel assembly 15 to pivot rearward to the position shown. The third elongated gasket 18 creates a seal between the front corner post 17 and the wing 14b when the invention is in a closed position. The first elongated gasket 12 (which is also vertically oriented)

creates a seal between the vertical gasket plate 11 and the wing 14b when the invention is in an open position (see FIG. 14).

Although the preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A telescoping container system comprising:
   (a) a first container having a top panel, a floor, a first side wall, a second side wall, a rear wall, and two front corner posts;
   (b) a second container having a top panel, a floor, a first side wall, a second side wall, a front wall and two front corner posts, the second container being configured to slide into and out of the first container;
   (c) a first non-pivoting guide wheel and a second non-pivoting guide wheel;
   (d) a first pivoting guide wheel assembly and a second pivoting guide wheel assembly, each pivoting guide wheel assembly comprising a hinge, a front pivoting wheel plate, a rear pivoting wheel plate, and a wheel, the front and rear pivoting wheel plates both being pivotally attached to the hinge;
   (e) two first elongated gaskets, a second elongated gasket, and two third elongated gaskets; and
   (f) a front top rail that extends across a front edge of the top panel of the first container;
   wherein each of the first elongated gaskets is supported by a vertical gasket plate that extends laterally outward from a respective one of the two side walls of the second container;
   wherein the second elongated gasket is situated along a horizontal gasket plate that extends across a top rear edge of the top panel of the second container;
   wherein both of the first elongated gaskets are oriented perpendicularly relative to the second elongated gasket;
   wherein each of the first elongated gaskets is situated between one of the two side walls of the second container and one of the two side walls of the first container;
   wherein the second elongated gasket is situated between the top panel of the second container and the top panel of the first container;
   wherein each of the first and second non-pivoting guide wheels is situated on an end of the horizontal gasket plate;
   wherein each of the pivoting guide wheel assemblies is situated on a wing that extends inwardly from one of the two front corner posts of the first container;
   wherein each of the first elongated gaskets is configured to create a seal between one of the two vertical gasket plates and a back surface of one of the wings when the telescoping container system is in an open position;
   wherein the second elongated gasket is configured to create a seal between the horizontal gasket plate and a rear surface of the front top rail when the telescoping container system is in an open position;
   wherein each of the third elongated gaskets extends vertically along a respective back surface of each of the front corner posts of the second container; and
   wherein each of the third elongated gaskets is configured to create a seal between each of the front corner posts of the second container and a front surface of each of the wings when the telescoping container system is in a closed position.

2. The telescoping container system of claim 1, further comprising a wiper seal that extends downwardly from a bar that is situated underneath the front top rail
   wherein the top panel of the second container has a width;
   wherein the wiper seal is at least as long as the width of the top panel of the second container; and
   wherein the wiper seal is configured to create a seal between the top panel of the second container and a front edge of the top panel of the first container.

3. The telescoping container system of claim 2, wherein each of the front corner posts of the first container has a top and a bottom;
   wherein each wing extends from the top to the bottom of the front corner post;
   wherein each of the wings has a width;
   wherein there is a certain distance between the side walls of the first container and the side walls of the second container;
   wherein the width of each wing is less than the distance between the side walls of the first and second containers;
   wherein the vertical gasket plate has a width;
   wherein the width of each wing is approximately equal to the width of the vertical gasket plate; and
   wherein a top end of each wing is situated underneath the top front rail.

4. The telescoping container system of claim 3, wherein each wing comprises a cutout that is situated behind and beneath the wiper seal; and
   wherein each of the pivoting guide wheel assemblies is situated within respective cutouts in one of the two wings.

5. The telescoping container system of claim 2, wherein each of the pivoting guide wheel assemblies is situated beneath the wiper seal and at or below a level of the top panel of the second container.

6. The telescoping container system of claim 1, wherein when the second container is situated inside of the first container, there is a certain distance between the side walls of the first container and the side walls of the second container;
   wherein the horizontal gasket plate extends beyond each of the first and second side walls of the second container for a distance that is less than the distance between the side walls of the first container and the side walls of the second container;
   wherein the horizontal gasket plate has a length, the front wall of the second container has a width, and the length of the horizontal gasket plate is greater than the width of the front wall of the second container;
   wherein the first non-pivoting guide wheel is connected to a first distal end of the horizontal gasket plate via a first bracket;
   wherein the second non-pivoting guide wheel is connected to a second distal end of the horizontal gasket plate via a second bracket; and
   wherein the first non-pivoting guide wheel is configured to be proximate to a corner bracket of the first container when the telescoping container system is in a closed position.

7. The telescoping container system of claim 1, wherein each of the first elongated gaskets has a length, the second container has a height, and the length of each of the first elongated gaskets is approximately equal to the height of the second container; and wherein the second elongated gasket has a length, the horizontal gasket plate has a length, and the length of the second elongated gasket is approximately equal to the length of the horizontal gasket plate.

8. The telescoping container system of claim 1, wherein the second elongated gasket is situated on top of the top panel of the second container; and wherein the horizontal gasket plate is situated above the top panel of the second container.

9. The telescoping container system of claim 1, wherein each of the first elongated gaskets has a top end;

wherein the top end of each of the first elongated gaskets is lower than the first and second non-pivoting guide wheels; and wherein each of the non-pivoting guide wheels is situated on a same horizontal plane as the second elongated gasket.

10. The telescoping container system of claim 9, wherein the top end of each of the first elongated gaskets is configured to abut up against the rear pivoting wheel plate of the first or second pivoting guide wheel assembly, thereby causing the first and second pivoting guide wheel assemblies to pivot forward, when the second container is moved to the open position.

11. The telescoping container system of claim 1, wherein the wheel is attached via a pin to a bracket that is pivotally attached to the hinge; and wherein the bracket is longer than the front and rear pivoting wheel plates so that the wheel is not surrounded by the plates.

12. The telescoping container system of claim 1, wherein each of the first elongated gaskets is configured to abut up against the rear pivoting wheel plate of the first or second pivoting guide wheel assembly when the second container is moved to the open position.

13. The telescoping container system of claim 1, wherein each of the pivoting guide wheel assembles is situated lower than each of the non-pivoting guide wheels relative to the top panel of the first container.

14. The telescoping container system of claim 1, wherein the wheel of each of the pivoting guide wheel assemblies is configured to be proximate to a rear corner post of the second container when the second container is in the open position.

15. The telescoping container system of claim 1, wherein each of the third elongated gaskets is configured to come into contact with the front pivoting wheel plate of one of the first or second pivoting guide wheel assemblies, thereby causing the first and second pivoting guide wheel assemblies to pivot rearward, when the telescoping container system is in a closed position.

* * * * *